(No Model.)
A. J. CONEN.
CLOTH SCALE.
No. 450,002. Patented Apr. 7, 1891.
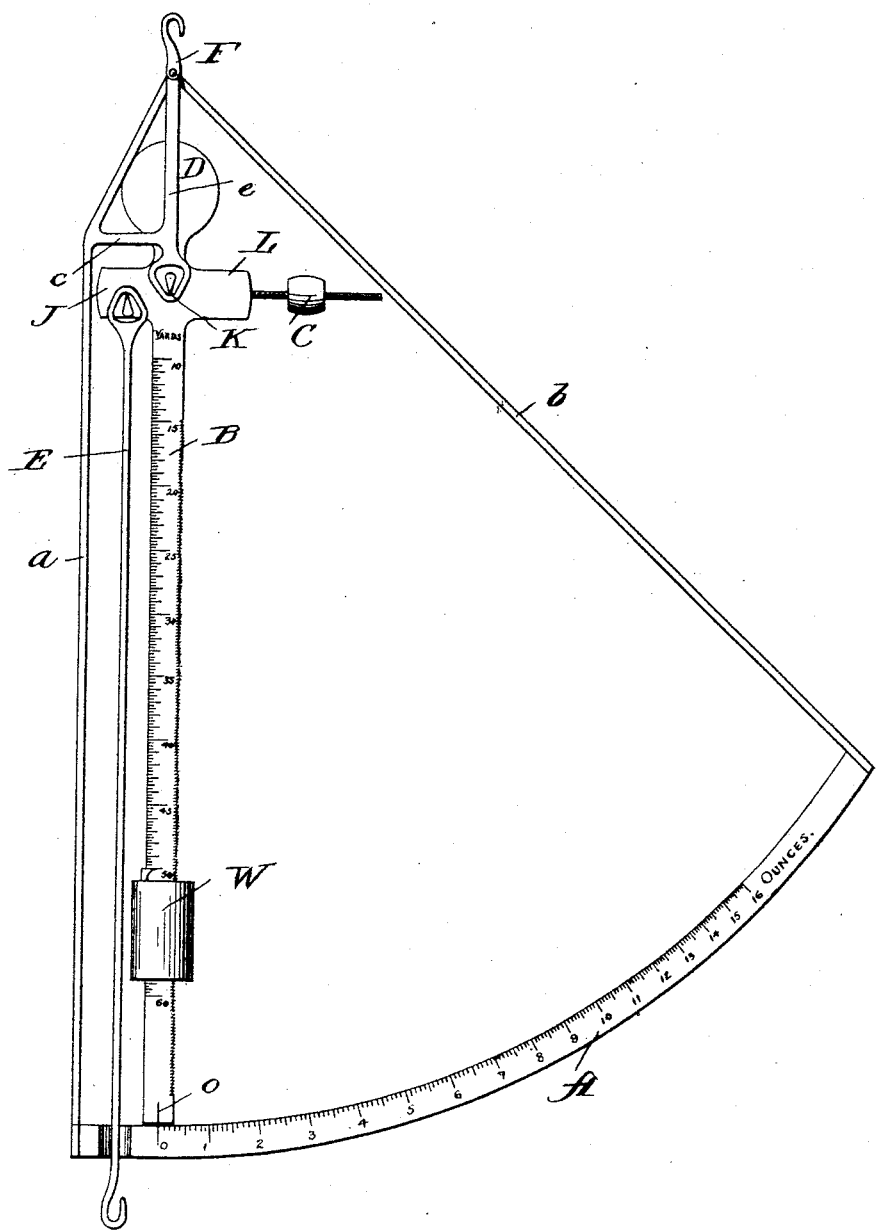
Witnesses
Walter P. Keene
F. L. Middleton
Inventor
Alexander J. Conen
by Ellis Spear
Atty.

UNITED STATES PATENT OFFICE.

ALEXANDER JOSEPH CONEN, OF LOUISVILLE, KENTUCKY.

CLOTH-SCALE.

SPECIFICATION forming part of Letters Patent No. 450,002, dated April 7, 1891.

Application filed November 19, 1890. Serial No. 371,938. (No model.)

*To all whom it may concern:*

Be it known that I, ALEXANDER JOSEPH CONEN, a citizen of the United States of America, residing at Louisville, in the county of Jefferson and State of Kentucky, have invented certain new and useful Improvements in Cloth-Scales, of which the following is a specification.

My said invention relates to weighing-scales, and is an improvement upon that class of scales in which the article weighed is made to move an arm over a graduated scale.

The apparatus invented by me and herein described is designed mainly for the purpose of weighing cloth in order to ascertain the average weight of the cloth per yard, and it is intended to be used in woolen and cotton mills for the purpose of saving time now required in weighing the goods by the ordinary weighing apparatus.

The invention is shown in the accompanying drawing, in which the single view shows the apparatus in side elevation.

The figure shows the form which I have adopted to represent my invention, it being understood that this precise form is not essential to my invention, but may be varied, subject to the limitations herein explained.

The arc A, formed upon a circle struck from K as a center, forms a part of the segmental frame which is suspended from a hook F. The ends of the arc are connected to the hook by rods or bars $a$ $b$. The left-hand rod $a$ is preferably bent to give more space at the upper angle and is braced by a strut $c$, which bears against the suspension rod or chain $e$. From the suspension-rod is hung a metal beam B, graduated, as shown, for yards and quarters of yards. It is suspended from the rod $e$, being pivoted, preferably, upon a knife-edge $x$ $x$ at K. The upper end of the beam is provided with two arms extending at right angles to the main beam. On the arm J is pivoted, preferably by a knife-edge, a suspension-rod E, the lower end of which is provided with a hook, to which the cloth is attached in weighing. The other arm L carries a weight C, adjustable so that it may be set exactly to counterbalance the weight of the rod or chain E, and in line with the main beam at the upper end is a counterbalancing-weight D to equalize the main beam B. The graduations are shown on the beam B, the graduations representing yards and quarters of yards numbered from top downward in order. The edge of the beam is provided with notches, as shown, adapted to engage with a tooth on the weight W, in order that the weight may be suspended on the beam at any point desired. The graduations upon the arc A represent ounces and tenth of ounces. All the parts are preferably made of metal. The size may be varied, the proportions of the subdivisions of the scales on the beam and arc being maintained in the same relation to each other.

It is assumed that the number of yards of a bolt of cloth to be tested is known. The weight W is slid upon the beam B until the pointer thereon stands at the point on the scale indicative of the number of yards in the bolt of cloth. Then the bolt is hung at the lower end of the rod or chain E and the weight of it will swing the beam to the right. The point on the scale of the arc A, where rests the pointer $o$ of the beam B will indicate the number of ounces per yard of the cloth tested.

The instrument may be used as an ordinary weighing-machine by marking a scale on the back of the arc A, indicating pounds and ounces, and by fixing the weight W at a proper point on the beam.

I claim as my invention—

1. The combination of the vertically-pivoted arm having a scale thereon and a sliding weight, the rod or chain E, and the graduated scale A, the parts being constructed and arranged to operate substantially as described.

2. The combination of the suspended arc, pivoted beam B, having a weight and counterweights, and the rod or chain E, substantially as described.

In testimony whereof I affix my signature in presence of two witnesses.

ALEXANDER JOSEPH CONEN.

Witnesses:
  C. C. OVERTON,
  FRED BURKHOLDER.